Patented Nov. 25, 1930

1,783,166

UNITED STATES PATENT OFFICE

HERMAN ALEXANDER BRUSON, OF PHILADELPHIA, PENNSYLVANIA, ASSIGNOR TO THE RESINOUS PRODUCTS & CHEMICAL COMPANY, A CORPORATION OF DELAWARE

RESIN PLASTICIZER

No Drawing.   Application filed July 5, 1929. Serial No. 376,288.

This invention relates to a method for preparing toughened resinous materials, and also to films and coatings prepared therefrom which possess unusual flexibility. More especially, it describes a method whereby brittle resins, such as phenol-formaldehyde condensation products or other brittle resins, may be plasticized to form tough, flexible masses from which molded objects may be fabricated, or from which flexible varnish coatings may be obtained.

In my co-pending application bearing Serial No. 311,256, there are described rubber-like resins which are obtained by condensing a polyhydric alcohol, notably glycerol, with long chained aliphatic dibasic acids characterized by having six or more carbon atoms linked together in a straight chain, such acids being specifically:—

Adipic acid, $HOOC-(CH_2)_4-COOH$
Pimelic acid, $HOOC-(CH_2)_5-COOH$
Suberic acid, $HOOC-(CH_2)_6-COOH$
Azelaic acid, $HOOC-(CH_2)_7-COOH$
Sebacic acid, $HOOC-(CH_2)_8-COOH$ or mixtures thereof.

Now I have found that if a solution of a phenol-formaldehyde resin is mixed with a solution of the above mentioned condensation products in suitable proportions, homogeneous solutions may be obtained which, upon evaporation of the solvent, deposit strongly adherent, tough, flexible films that remain flexible, even upon baking for a prolonged period of time. Such films in either the unbaked or baked state are insoluble in oils or hydrocarbons and may be used for coating oil-storage tanks where, on account of contractions and expansions of the tank, elasticity of the film is of prime importance. Suitable solvents for the above mixture are those which are capable of mutually dissolving both the phenol-formaldehyde resins and the rubbery, resinous condensation products. Acetone, alcohol, ethyl acetate and butyl acetate are appropriate solvents for this purpose.

Example 100 parts by weight of a soluble "Novolack" phenol-formaldehyde resin or "reactive" phenol-aldehyde resin is dissolved in 200 parts alcohol and mixed with 50 parts by weight of the soluble, rubbery condensation product prepared by heating glycerol with sebacic acid, which latter compound is described in my co-pending application bearing Serial No. 311,256. A clear solution is obtained, which upon evaporation of the solvent, deposits a tough, adherent, flexible film that is resistant to gasoline and oils.

The quantity of rubbery condensation product may be increased to give still more flexible and softer films, or it may be decreased to yield somewhat harder films. The films may be baked at 150° C. for several hours, whereby the rubbery plasticizer becomes insoluble without losing flexibility. An infusible, tough, elastic, insoluble coating upon metal may thereby be obtained if the reactive type phenol-formaldehyde resin is employed.

In place of the sebacic acid-glycerol condensation product, any of the soluble condensation products of a polyhydric alcohol with adipic, pimelic, suberic, azelaic acids or mixtures of these acids may be employed as described in the aforementioned application, Serial No. 311,256.

Resins other than the phenol-formaldehyde resins mentioned above may be similarly plasticized as described above. These include shellac, cresol-formaldehyde resins, ketone-formaldehyde resins and condensation products of phenol with furfural, and formaldehyde-urea resins. Other hard, brittle synthetic resins that are alcohol soluble may likewise be plasticized.

Instead of preparing a solution of the two resin components, the solid, hard, brittle resin may be powdered and mixed directly with the viscous, rubbery condensation products enumerated herein. This may be done in a mixer so as to obtain an impregnated powder or pasty mass that may be used for molding objects of practical value.

What I claim is:

1. Method of plasticizing phenol aldehyde resins which consists in incorporating therewith a condensation product of a polyhydric alcohol and a member of the group consisting of pimelic, suberic, azelaic and sebacic acids.

2. Method of plasticizing phenol aldehyde resins which consists in incorporating therewith a condensation product of glycerol and a member of the group consisting of pimelic, suberic, azelaic and sebacic acids.

3. Method of plasticizing phenol aldehyde resins which consists in incorporating therewith a condensation product of a polyhydric alcohol and sebacic acid.

4. A composition of matter comprising a phenol aldehyde resin and a condensation product of a polyhydric alcohol with a member of the group consisting of pimelic, suberic, azelaic and sebacic acids.

5. A composition of matter comprising a phenol aldehyde resin and a condensation product of glycerol with a member of the group consisting of pimelic, suberic, azelaic and sebacic acids.

6. A composition of matter comprising a phenol aldehyde resin and a condensation product of glycerol and sebacic acid.

7. A composition of matter comprising a phenol aldehyde resin and a condensation product of a polyhydric alcohol and sebacic acid.

8. A composition adapted for lining oil storage tanks comprising a phenol formaldehyde resin and a condensation product of glycerol and sebacic acid.

HERMAN ALEXANDER BRUSON.